Dec. 26, 1933.    E. M. GRAVES    1,941,395
JACK ATTACHMENT
Filed May 5, 1932
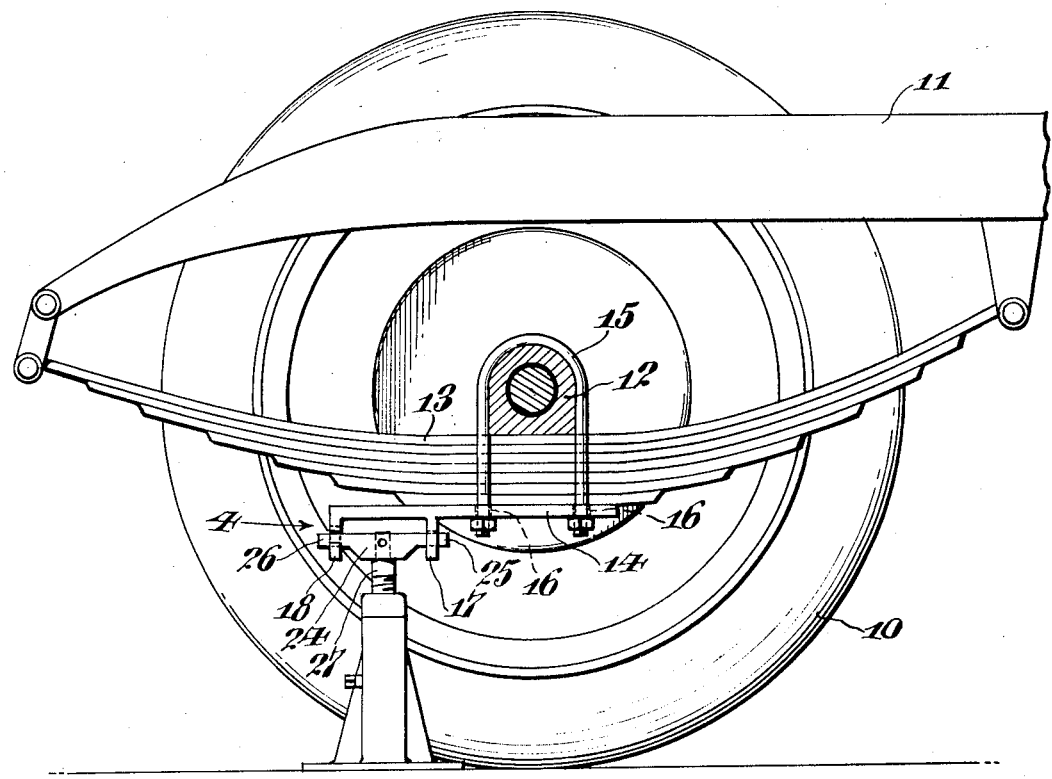
Fig. 1.
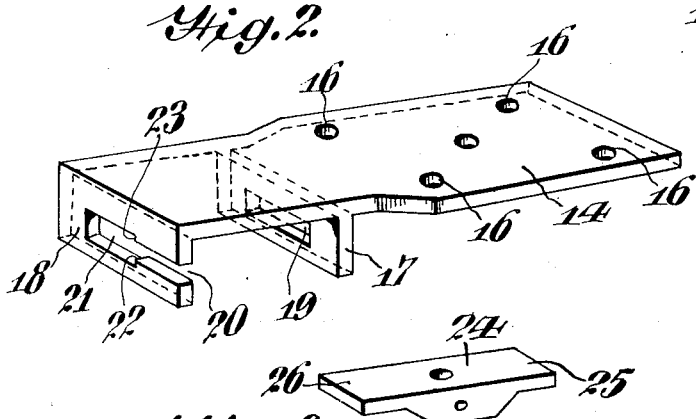
Fig. 2.
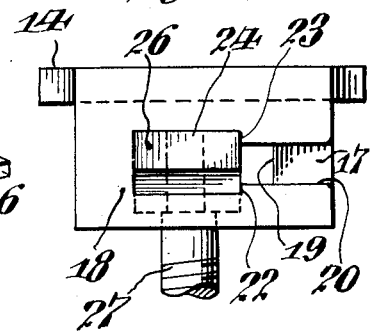
Fig. 4.
Fig. 3.
Inventor
Elles Myers Graves,
By Joshua R H Potts
Attorney Patented Dec. 26, 1933

1,941,395

UNITED STATES PATENT OFFICE 1,941,395

JACK ATTACHMENT

Elles Myers Graves, Philadelphia, Pa.

Application May 5, 1932. Serial No. 609,386

3 Claims. (Cl. 254—133)

This invention relates to jack attachments, and has for an object to provide a device attached to an axle, and to which the head of a jack properly contoured is attached to prevent slipping of the vehicle relative to the jack.

A further object of the invention is to provide a device which is attached to the axle of the vehicle, and under certain conditions replaces the shackle plate and presents at a point nearer of access than the axle itself a structure for engaging the head of a jack which will prevent the jack from tilting relative to the vehicle.

The invention therefore comprises a plate which is designed to be attached beneath the axle of a vehicle and extend outwardly therefrom, having downwardly extending flanges with recesses formed therein to engage a jack head of proper contour to properly connect the jack head and plate to prevent slippage of the jack relative to the vehicle, or the tilting of the jack in any direction.

The drawing illustrates an embodiment of the invention and the views therein are as follows:

Figure 1 is a view of the invention in side elevation applied to a conventional axle and conventional jack body, Figure 2 is a perspective view of the plate, Figure 3 is a perspective view of the jack head, and Figure 4 is a detail view in end elevation of the jack head properly seated for action, as indicated by arrow 4 at Figure 1.

Like characters of reference indicate corresponding parts throughout the several views.

The jack attachment, which forms the subject matter of this application, is adapted to be attached to vehicles of various types. At Figure 1, a vehicle including a wheel 10, a frame 11, an axle 12, and a spring 13 is illustrated. The vehicle is illustrated only for the purpose of disclosing one manner of attaching the invention.

In such an underslung attachment as shown in the figure, the plate 14 is placed under the spring 13 and the clips or shackles 15 span over the axle and are inserted through some of the perforations 16 of the plate. A number of these perforations are shown at Figure 2, to accommodate various types of structures, but it is to be understood that the perforations may be properly spaced and in proper number to coact with any type of vehicle and vehicle organization.

The plate extends outwardly from the axle. As illustrated at Figure 1, the axle 12 is assumed to be a rear axle in which case, the plate extends to the rear of the axle. In the case of a front axle, the plate would extend to the front of the axle so that the position for the jack would be somewhat removed from the axle and more convenient of access than the axle itself.

The plate 14 has downwardly extending flanges 17 and 18, the former provided with a slot 19 and the latter with a slot 20 which opens into a wider part 21, forming shoulders 22 and 23.

The jack head is shown as an entirety at 24 and comprises wings 25 and 26 properly proportioned to fit into the slot 19 and enter through the slot 20. This head 24 is mounted pivotally upon the lifting part 27 of the jack. In the drawing, this jack is shown as a screw jack, but it is to be understood that the device is applicable to any type of jack.

In operation, the jack head is raised to such a position that the wing 25, for instance, will enter the slot 19 and by rotary action, the other wing 26 will enter through the slot 20 into the enlarged slot 21.

In this position, the shoulder 22 will prevent the jack from being displaced, while it is being placed in position. The entire jack structure may at this point be suspended from its head so placed. When the jack is manipulated by operating the lifting structure, as for instance the screw 27, the wing 26 will rise in the slot 20 until it is in engagement with the shoulder 23, and being already in engagement with the slot 19, will prevent the jack from slipping or turning relative to the vehicle, or the vehicle slipping or sliding relative to the jack. The jack is, therefore, adapted to be used under conditions where an ordinary jack would be ineffective as not properly supporting the vehicle and therefore permitting the vehicle to either roll or slide from the position of the jack.

Of course, the jack attachment herein illustrated, may be modified and changed in various ways without departing from the invention herein set forth and hereinafter claimed.

The invention is hereby claimed as follows:

1. A jack attachment comprising a plate adapted to be attached rigidly to a vehicle and extend outwardly therefrom, said outwardly extending part being provided with downwardly spaced flanges, said flanges being provided with slots, one of said slots being open entirely to the side and enlarged at its inner limit, and a jack head having oppositely directed wings contoured to enter the slots and be retained by the constriction formed at the enlarged part.

2. A jack attachment comprising a plate adapted to be attached rigidly to a vehicle and extend outwardly therefrom, said outwardly extending part being provided with downwardly turned spaced flanges, said flanges being provided with slots, one of said slots being open entirely to the side, and a jack head having oppositely directed wings contoured to enter said slots and be retained thereby.

3. A jack attachment comprising a part adapted to be permanently attached to a vehicle, spaced abutments formed upon said part, said abutments having slots therein, one of said slots being continued to the side of the abutment forming a constricted lateral opening, and a jack head having oppositely directed sections adapted to fit into said slots, one to pass therein through said constriction.

ELLES MYERS GRAVES.